United States Patent
Nakanishi et al.

(10) Patent No.: US 8,827,866 B2
(45) Date of Patent: Sep. 9, 2014

(54) VEHICLE AND CONTROL METHOD

(71) Applicant: Toyota Jidosha Kabushiki Kaisha, Toyota (JP)

(72) Inventors: Naoki Nakanishi, Susono (JP); Shintaro Matsutani, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/026,502

(22) Filed: Sep. 13, 2013

(65) Prior Publication Data

US 2014/0080663 A1  Mar. 20, 2014

(30) Foreign Application Priority Data

Sep. 18, 2012 (JP) .................................. 2012-204953

(51) Int. Cl.
| | |
|---|---|
| B60W 10/02 | (2006.01) |
| B60W 10/06 | (2006.01) |
| B60W 10/08 | (2006.01) |
| B60W 20/00 | (2006.01) |
| B60W 30/18 | (2012.01) |

(52) U.S. Cl.
CPC .............. *B60W 20/40* (2013.01); *B60W 30/18* (2013.01); *B60W 10/02* (2013.01); *B60W 10/08* (2013.01); *Y10S 903/902* (2013.01); *B60W 10/06* (2013.01)
USPC .............................................. 477/5; 903/902

(58) Field of Classification Search
USPC ......................... 477/5; 180/65.265; 903/902
See application file for complete search history.

(56) References Cited

U.S. PATENT DOCUMENTS

| | | | |
|---|---|---|---|
| 6,296,593 B1 * | 10/2001 | Gotou et al. | .................. 477/176 |
| 7,273,120 B2 * | 9/2007 | Tabata | ..................... 180/65.265 |
| 2009/0105038 A1 | 4/2009 | Weiss et al. | |
| 2011/0021312 A1 * | 1/2011 | Fukitani | ........................... 477/5 |

FOREIGN PATENT DOCUMENTS

| | | |
|---|---|---|
| JP | 2007276650 A | 10/2007 |
| JP | 2009-527411 A | 7/2009 |
| JP | 2011-016390 A | 1/2011 |

* cited by examiner

*Primary Examiner* — Edwin A Young

(74) *Attorney, Agent, or Firm* — Kenyon & Kenyon LLP

(57) ABSTRACT

When an engine is started in a motor running mode, a control unit performs engine starting control by raising the engine speed through slip engagement of an engine coupling/decoupling clutch, temporarily reducing engaging force of the engine coupling/decoupling clutch after the engine becomes able to rotate by itself, and then fully engaging the engine coupling/decoupling clutch. The control unit advances the intake valve opening/closing timing at an earlier point in time as the motor speed is higher.

8 Claims, 6 Drawing Sheets

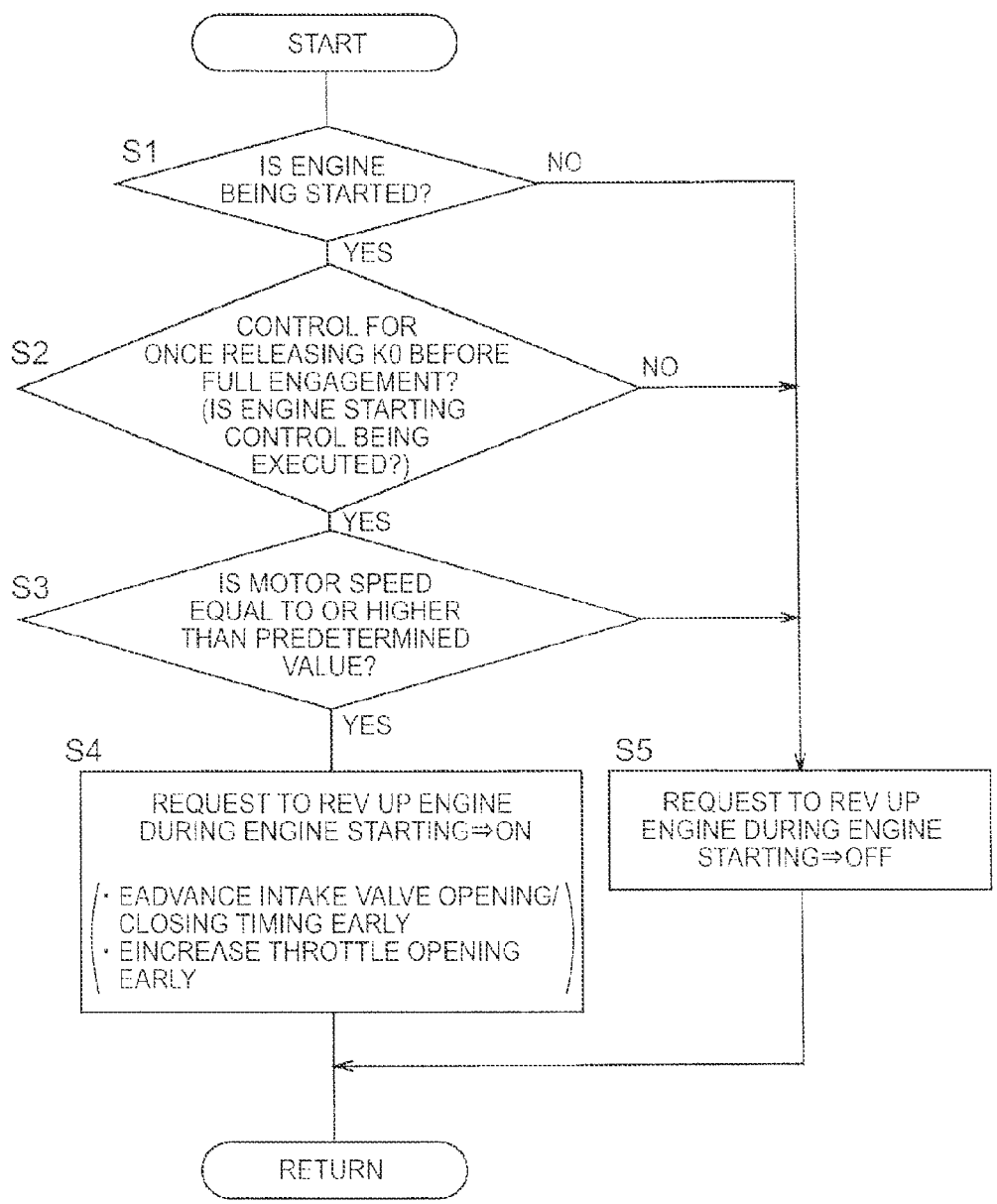

VEHICLE AND CONTROL METHOD

INCORPORATION BY REFERENCE

The disclosure of Japanese Patent Application No. 2012-204953 filed on Sep. 18, 2012 including the specification, drawings and abstract is incorporated herein by reference in its entirety.

BACKGROUND OF THE INVENTION

1. Field of the Invention

The invention relates to a vehicle in which engine starting control is performed when an engine is started while the vehicle is running with power of a motor, and also relates to a control method for the vehicle.

2. Description of Related Art

A vehicle including an engine, a motor, and an engine clutch that selectively couples the engine to a power transmission path from the motor to driving wheels is known. A control system for this type of vehicle is disclosed in, for example, Japanese Patent Application Publication No. 2011-016390 (JP 2011-016390 A). The control system for the vehicle disclosed in JP 2011-016390 A performs engine starting control for temporarily releasing the engine clutch during a period from the beginning of engagement of the engine clutch to full engagement thereof, when the engine is started while the vehicle is running only with power of the motor. More specifically, under the engine starting control, the control system initially increases the engine speed by partially engaging the engine clutch while allowing the clutch to slip, and releases the engine clutch when the engine speed reaches a predetermined rotational speed at which it is determined that the engine is able to rotate by itself. Then, the control system for the vehicle further increases the engine speed in a condition where the engine clutch is released. The control system starts an operation to engage the engine clutch after the engine speed becomes higher than the motor speed, and fully engages the engine clutch when the engine speed becomes equal to the motor speed.

The engine starting control performed when the engine is started while the vehicle is running with power of the motor is considerably effective in reducing shocks when the engine is started. In starting the engine under the engine starting control, the engine speed needs to be increased from an engine stop condition until it becomes equal to the motor speed. The increase of the engine speed is assisted by torque of the motor while the engine clutch is partially engaged while slipping. However, the engine speed is basically increased by engine torque. It follows that, when the motor speed is high, such as when the vehicle is running with power of the motor at a high vehicle speed, the engine speed needs to be increased by a large amount to the motor speed, from the engine stop condition, when the engine is started. Namely, a period of time it takes from the time when engine starting is initiated to the time when the engine speed becomes equal to the motor speed, namely, a period of time it takes from the time when engine starting is initiated to the time when the engine clutch is fully engaged, is prolonged. As a result, the driveability may deteriorate; more specifically, the driver may feel uncomfortable, or the response of the driving force may be reduced. This problem has not been publicly known.

SUMMARY OF THE INVENTION

The invention was developed in view of the above situation, and provides a vehicle having an engine and a motor, and a control method therefor, which is less likely to suffer from deterioration of the driveability when the engine is started while the vehicle is running with power of the motor.

A vehicle according to one aspect of the invention includes an engine, a motor, a clutch and a control unit. The engine includes a variable valve timing mechanism for an intake valve, and the variable valve timing mechanism is configured to advance or retard the intake valve timing. The clutch selectively couples the engine to a power transmission path between the motor and driving wheels. The control unit is configured to perform engine starting control when the engine is started in a motor running mode in which the vehicle runs only with power of the motor, by partially engaging the clutch while allowing the clutch to slip so as to raise a rotational speed of the engine, temporarily reducing engaging force of the clutch after the engine becomes able to rotate by itself, and then fully engaging the clutch. The control unit is also configured to advance the intake valve timing at an earlier point in time, after the engine starting control is initiated, as a rotational speed of the motor detected when the engine is started in the motor running mode is higher.

With the above arrangement, even if the motor speed is high when the engine is started in the motor running mode, the intake air amount of the engine is increased due to advancement of the intake valve timing, in accordance with the motor speed. As a result, engine torque is increased. Thus, the period of time it takes from the time when engine starting is initiated to the time when the engine speed becomes equal to the motor speed, namely, the period of time it takes from the time when engine starting is initiated to the time when the clutch is fully engaged, is less likely or unlikely to be prolonged due to the high motor speed. Accordingly, when the engine is started in the motor running mode, deterioration of the driveability, such as reduction of the response of the driving force, can be curbed. The intake valve timing means at least the valve-closing timing of the intake valve, and may mean the valve-opening timing and valve-closing timing of the intake valve.

The vehicle as described above may be configured as follows. The control unit is configured to increase a throttle opening of the engine after the engine starting control is initiated, when the engine is started in the motor running mode, and the control unit is configured to increase the throttle opening at an earlier point in time as the rotational speed of the motor detected when the engine is started in the motor running mode is higher. With this arrangement, the intake air amount of the engine increases due to the increase of the throttle opening, in accordance with the motor speed. Accordingly, even if the motor speed is high when the engine is started in the motor running mode, engine torque is increased in accordance with the motor speed. Consequently, the period of time it takes from the time when engine starting is initiated to the time when the clutch is fully engaged is less likely or unlikely to be prolonged due to the high motor speed. Accordingly, when the engine is started in the motor running mode, deterioration of the driveability, such as reduction of the response of the driving force, can be curbed.

The vehicle as described above may be configured as follows. The control unit is configured to advance the intake valve timing, after the intake valve is closed in an cylinder in which the intake valve is open at a time when starting of the engine is initiated, and a piston approaches a top dead center first since the time when starting of the engine is initiated. When the engine is started, compression torque that appears in the cylinder that approaches the top dead center first when the engine starts being rotated results in rotational resistance of the engine. However, if the intake valve timing is advanced in the above-described manner, the compression torque is less likely or unlikely to affect rotation of the engine. Accordingly, it is possible to quickly complete engine starting without unnecessarily increasing the rotational resistance of the engine.

The vehicle as described above may be configured as follows. The control unit is configured to advance an ignition timing of the engine when the rotational speed of the motor is equal to or higher than a high-speed rotation determination value.

A control method according to another aspect of the invention is applied to a vehicle including an engine, a motor, and a clutch that selectively couples the engine to a power transmission path between the motor and driving wheels. The control method includes executing engine starting control, and advancing the intake valve timing at an earlier point in time, after the engine starting control is initiated, as a rotational speed of the motor detected when the engine is started in a motor running mode in which the vehicle runs only with power of the motor is higher. The engine starting control includes the steps of i) raising a rotational speed of the engine by partially engaging the clutch while allowing the clutch to slip, when the engine is started in the motor running mode, ii) temporarily reducing engaging force of the clutch after the engine becomes able to rotate by itself, and iii) fully engaging the clutch after the step ii).

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a flowchart useful for explaining control operations of the electronic control unit of FIG. 1, namely, control operations to perform early advancement control on the intake valve opening/closing timing and early increase control on the throttle opening, during execution of engine starting control.

DETAILED DESCRIPTION OF EMBODIMENTS

One embodiment of the invention will be described in detail with reference to the drawings.

Figure 1:
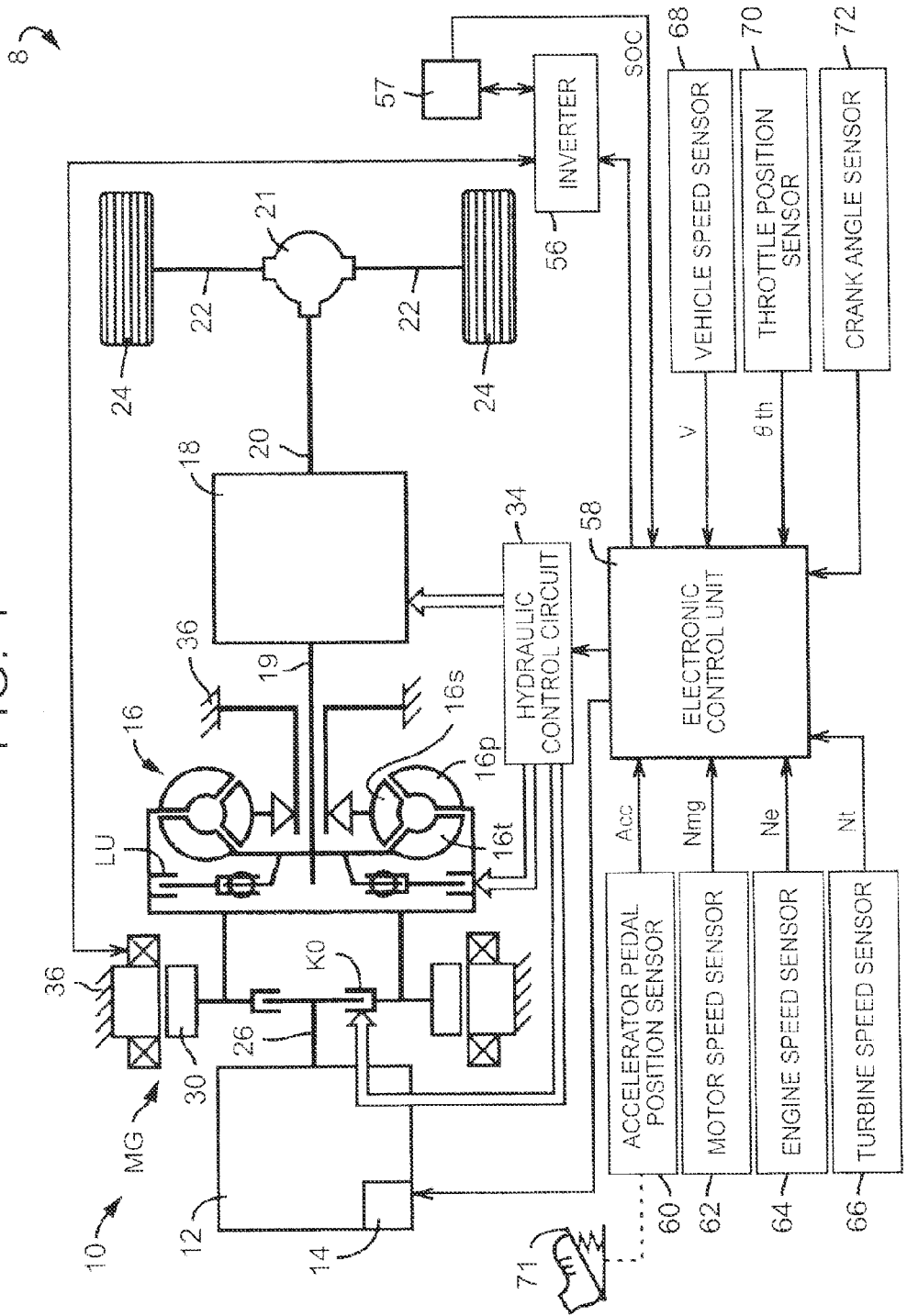
FIG. 1 is a view schematically showing the construction of a driving system of a hybrid vehicle according to one embodiment of the invention.

FIG. 1 schematically shows the construction of a driving system of a hybrid vehicle 8 (which will also be simply called "vehicle 8") as one embodiment of the invention. The hybrid vehicle 8 includes a vehicular power train 10 (which will be called "power train 10"), a differential gear device 21, a pair of right and left axles 22, a pair of right and left driving wheels 24, a hydraulic control circuit 34, an inverter 56, and an electronic control unit 58. The power train 10 includes an engine 12 that functions as a source of driving power for running the vehicle, an engine output control unit 14 that performs engine output control, such as starting or stopping of the engine 12, or throttle control, an electric motor MG for running the vehicle, which functions as a source of driving power for running the vehicle, an engine coupling/decoupling clutch K0 corresponding to the clutch of the invention, a torque converter 16, and an automatic transmission 18. As shown in FIG. 1, the vehicle 8 is constructed such that power generated by one or both of the engine 12 and the motor MG is transmitted to the right and left driving wheels 24, via the torque converter 16, automatic transmission 18, differential gear device 21, and the right and left axles 22, respectively. Thus, the vehicle 8 is able to run in a selected one of an engine running mode in which the vehicle 8 runs with power of the engine 12, and an EV running (motor running) mode in which the vehicle 8 runs only with power of the motor MG while the engine 12 is being stopped. In the engine running mode, the motor MG may generate assist torque, depending on running conditions.

The motor MG, which is connected to the driving wheels 24, is a three-phase synchronous motor, for example. The motor MG is also a motor-generator that functions as a motor that generates power, and also functions as a generator that generates reaction force. For example, the motor MG operates in a regenerative manner so as to generate vehicle braking force. Also, the motor MG is electrically connected to a power storage device 57 via the inverter 56, so that electric power can be supplied and received between the motor MG and the power storage device 57. The power storage device 57 may be, for example, a battery (secondary battery), such as a lead storage battery, or a capacitor.

The engine coupling/decoupling clutch K0 (which will be called "clutch K0") is provided in a power transmission path between the engine 12 and the motor MG. The clutch K0 consists of a generally known, wet multiple disc type hydraulic friction device. The clutch K0 operates with a hydraulic pressure supplied from the hydraulic control circuit 34, and functions as a power transmission/cut-off device that selectively couples the engine 12 with the power transmission path between the motor MG and the driving wheels 24. More specifically, when the clutch K0 is engaged, an engine output shaft 26 (e.g., crankshaft) as an output member of the engine 12 is coupled to a rotor 30 of the motor MG such that the engine output shaft 26 and the rotor 30 cannot rotate relative to each other. When the clutch K0 is released, the engine output shaft 26 is disconnected from the rotor 30 of the motor MG. In short, the engine output shaft 26 is selectively coupled to the rotor 30 of the motor MG via the clutch K0. Accordingly, the clutch K0 is completely engaged while the vehicle 8 is running in the engine running mode, and is released while the vehicle 8 is running in the motor running mode. The rotor 30 of the motor MG is coupled to a pump wheel 16p of the torque converter 16 which receives power, such that the rotor 30 and the pump wheel 16p cannot rotate relative to each other.

The automatic transmission 18 constitutes a part of the power transmission path between the torque converter 16 and the driving wheels 24, and transmits power of the engine 12 or motor MG to the driving wheels 24. The automatic transmission 18 is a stepwise variable automatic transmission that performs clutch-to-clutch shifting through engagement and disengagement of coupling elements according to a pre-set relationship (shift diagram), based on the vehicle speed V and the accelerator operation amount Acc, for example. In other words, the automatic transmission 18 is an automatic speed-changing mechanism having a plurality of predetermined gear positions (gear ratios) of which a selected one is established. To establish the selected gear position or gear ratio, the automatic transmission 18 includes a plurality of planetary gear sets, and a plurality of clutches or brakes that operate with hydraulic pressures from the hydraulic control circuit 34. The gear ratio of the automatic transmission 18 is calculated according to an equation that "gear ratio=transmission input rotational speed Natin/transmission output rotational speed Natout".

The torque converter 16 is a hydraulic power transmission device interposed between the motor MG and the automatic transmission 18. The torque converter 16 includes a pump wheel 16p as an input-side rotational element that receives power of the engine 12 and the motor MG, a turbine wheel 16t as an output-side rotational element that delivers power to the automatic transmission 18, and a stator wheel 16s. In operation, the torque converter 16 transmits power received by the pump wheel 16p to the turbine wheel 16t via a fluid (working oil). The stator wheel 16s is coupled to a transmission case 36 as an irrotational member, via a one-way clutch. The torque converter 16 also includes a lock-up clutch LU located between the pump wheel 16p and the turbine wheel 16t. The lock-up clutch LU selectively establishes direct coupling between the pump wheel 16p and the turbine wheel 16t. The lock-up clutch LU is controlled with a hydraulic pressure supplied from the hydraulic control circuit 34.

Figure 2:
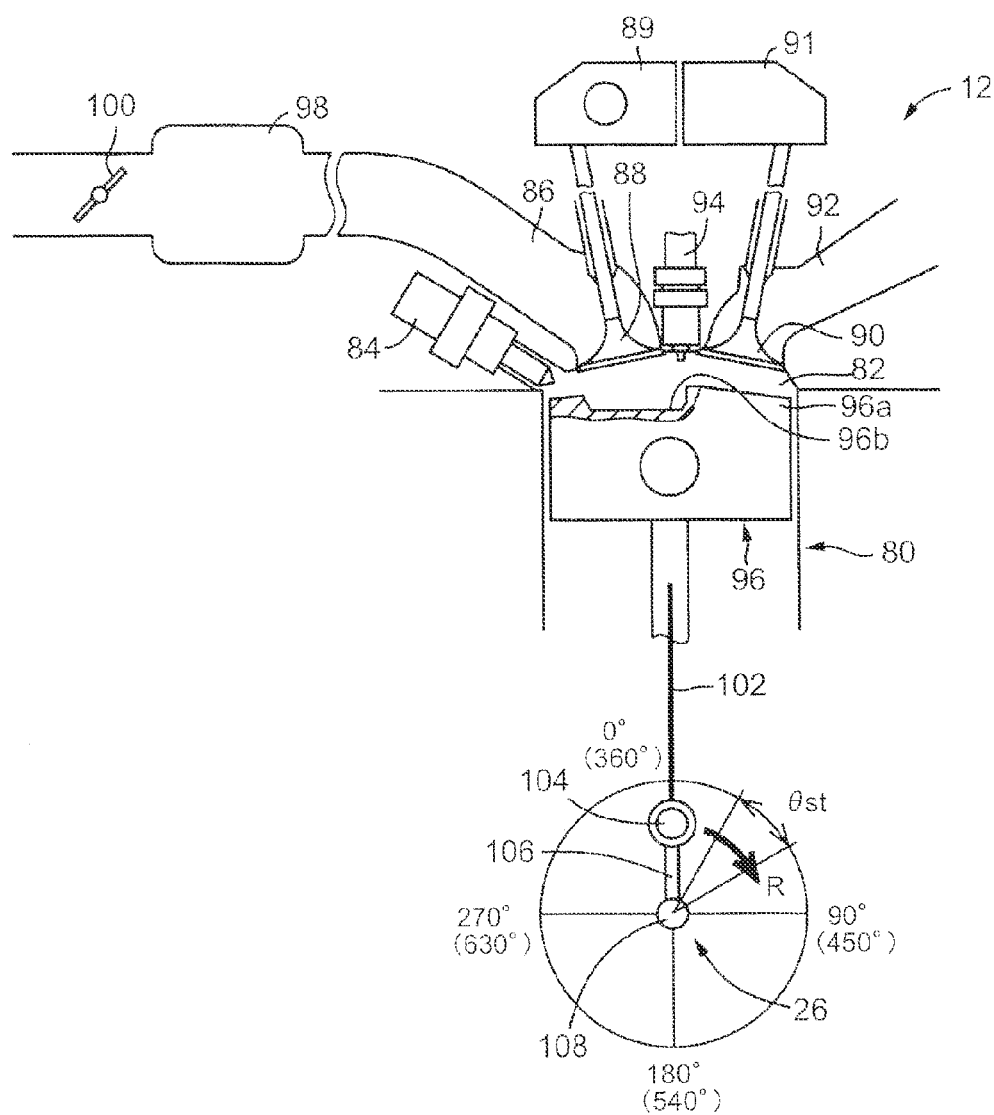
FIG. 2 is a cross-sectional view of a combustion chamber and its vicinity of a direct injection engine included in the hybrid vehicle of FIG. 1.

In this embodiment, the engine 12 is a V-eight, four-cycle, direct injection gasoline engine, and has a combustion chamber 82 formed in each cylinder 80. As specifically shown in FIG. 2, gasoline, which is in a condition of fine particles under high pressure, is directly injected from a fuel injection device 84 into the combustion chamber 82. In the engine 12, air flows into the combustion chamber 82, via an intake passage 86 and an intake valve 88, and exhaust gas is discharged from the combustion chamber 82 into an exhaust passage 92 via an exhaust valve 90. In the engine 12, an air-fuel mixture formed in the combustion chamber 82 is ignited at an appropriate time by an ignition device 94, so that the mixture explodes and burns, thereby to push a piston 96 downwards. The engine 12 includes an intake valve driving system 89 that consists of a cam mechanism. The intake valve driving system 89 reciprocates the intake valve 88 in synchronization with rotation of the crankshaft 26, so that the intake valve 88 opens and closes. The engine 12 also includes an exhaust valve driving system 91 that consists of a cam mechanism. The exhaust valve driving system 91 reciprocates the exhaust valve 90 in synchronization with rotation of the crankshaft 26, so that the exhaust valve 90 opens and closes. The intake passage 86 is connected to an electronic throttle valve 100 via a surge tank 98. The electronic throttle valve 100 is an intake air amount control valve that is operated (i.e., opened and closed) by an electrically-driven actuator. The amount of intake air that flows from the intake passage 86 into the combustion chamber 82, i.e., the engine output, is controlled according to the opening $\theta$th (throttle opening $\theta$th) of the electronic throttle valve 100. As shown in FIG. 2, the piston 96 includes a piston top portion 96a that is an end portion facing the combustion chamber 82 and forms a part of the combustion chamber 82. The piston top portion 96a includes a recessed portion 96b, or a cavity, which is open toward the combustion chamber 82. The piston 96 is slidably fitted in the cylinder 80, and is coupled to a crank pin 104 of the engine output shaft (crankshaft) 26 via a connecting rod 102, such that the crank pin 104 can rotate relative to the piston 96. Thus, the crankshaft 26 is rotated/driven as indicated by arrow R in FIG. 2 in accordance with linear reciprocating movements of the piston 96. The crankshaft 26 is rotatably supported by a bearing at a journal 108, and includes, as an integral part, a crank arm 106 that connects the journal 108 with the crank pin 104. The shape of the combustion chamber 82, such as the depth of the recessed portion 96b formed in the piston 96, is determined so that the fuel injected from the fuel injection device 84 during normal driving of the engine 12 hits against the recessed portion 96b, and forms a rich air-fuel mixture that contains adequately dispersed fuel and is likely to be ignited, around the ignition device 94, so that favorable explosion can be achieved. During normal driving of the engine 12, the fuel is injected during the compression stroke of each cylinder 80.

The engine 12 goes through four strokes, i.e., the intake stroke, compression stroke, expansion (explosion) stroke, and the exhaust stroke, while the crankshaft 26 makes two revolutions (720°) per cylinder, and these strokes are repeated so that the crankshaft 26 is continuously rotated. The pistons 96 of the eight cylinders 80 are positioned such that the crank angles corresponding to the respective pistons 96 differ by 90° each. In other words, the positions of the crank pins 104 that protrude from the crankshaft 26 are shifted by 90° each. With this arrangement, each time the crankshaft 26 rotates 90°, explosion/combustion takes place in a preset ignition order in the eight cylinders 80, so that rotational torque is continuously generated. Since the engine 12 is a direction injection engine, the engine 12 can be started through ignition starting in which the fuel is injected into the cylinder 80 and ignited from the beginning of rotation of the engine 12. More specifically, the ignition starting, or early ignition, is carried out by an engine starting method as follows. The crankshaft 26 rotates by a given angle from a condition where the piston 96 reaches the compression top dead center (compression TDC) after the compression stroke, and stops. The given angle is within a given angular range $\theta$st of the expansion stroke on which the intake valve 88 and the exhaust valve 90 are both closed. At this time, the fuel injection device 84 initially injects gasoline into the cylinder 80 (the combustion chamber 82) that is on the expansion stroke, and the ignition device 94 ignites an air-fuel mixture in the cylinder 80. As a result, the air-fuel mixture in the cylinder 80 explodes and burns so as to raise the engine speed Ne. The engine may be started through the ignition starting, without requiring cranking by the motor MG, etc. However, in this embodiment, the ignition starting is also performed when the engine 12 is started while the vehicle is running in the motor running mode. In this case, in order to enhance the starting performance of the engine 12, the clutch K0 is partially engaged while being allowed to slip, so that motor torque Tmg assists in raising the engine speed Ne. The above-indicated angular range $\theta$st, when expressed in terms of the crank angle after the compression top dead center, is preferably the range of about 30° to 60°, for example, in which relatively large rotational energy can be obtained through the ignition starting; however, the ignition starting is possible even when the crank angle after the compression TDC is about 90°.

Figure 3:
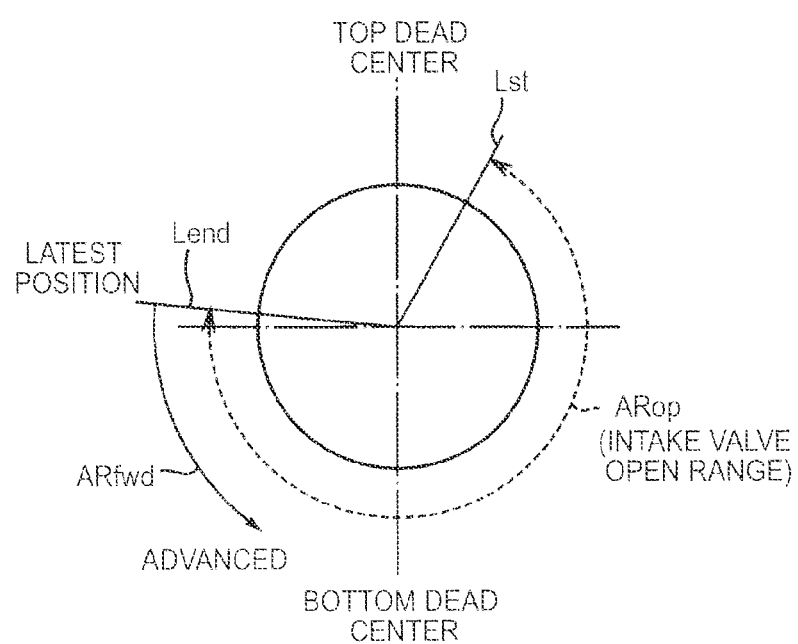
FIG. 3 is a view indicating an intake valve open range in which an intake valve is opened, in relation to the rotational angle of the crankshaft, in the direct injection engine included in the hybrid vehicle of FIG. 1.

The intake valve driving system 89 has the function of changing the opening/closing timing of the intake valve 88 as needed, and functions as a variable valve timing mechanism that advances or retards the opening/closing timing of the intake valve 88, for example. The opening/closing timing means the valve-opening timing and the valve-closing timing. For example, the intake valve driving system 89 opens the intake valve 88 over an open range of the intake valve as indicated by broken-line arrow ARop in FIG. 3, during the intake stroke of the engine 12. Namely, in FIG. 3 showing the crank angle, the valve-opening timing of the intake valve 88 is represented by solid line Lst after the top dead center, and the valve-closing timing of the intake valve 88 is represented by solid line Lend after the bottom dead center. The solid line Lend indicates the latest position within the range over which the valve-closing timing of the intake valve 88 can be adjusted, and arrow ARfwd indicates the advancing direction of the valve-closing timing. As is understood from the arrow ARfwd, advancing the valve-closing timing of the intake valve 88 means making the valve-closing timing after the bottom dead center closer to the bottom dead center.

For example, when the engine is started through the above-described ignition starting, the intake valve driving system 89 is controlled so that the opening/closing timing of the intake valve 88, more specifically, at least the valve-closing timing, is shifted (retarded) to the maximum in the retarding direction, within the range in which the valve-closing timing can be adjusted, so as to reduce rotational resistance in the beginning of rotation of the engine 12. Various operating principles of the intake valve driving system 89 are generally known. For example, the intake valve driving system 89 may be a cam mechanism that operates in association with rotation of the crankshaft 26, and operates (i.e., opens and closes) the intake valve 88 by selectively using any of a plurality of cams having mutually different shapes through hydraulic control or electric control. In another example, the intake valve driving system 89 may open and close the intake valve 88, by using a cam mechanism that operates in association with rotation of the crankshaft 26, and a mechanism that modifies the actions of the cams of the cam mechanism through hydraulic control or electric control. While the intake valve driving system 89 that functions as the variable valve timing mechanism is only required to change at least the valve-closing timing, the intake valve driving system 89 of this embodiment is mechanically arranged to change the valve-opening timing of the intake valve 88 at the same time that it changes the valve-closing timing of the intake valve 88, in the same direction in which the valve-closing timing is changed. Namely, the intake valve driving system 89 integrally changes the valve-opening timing and valve-closing timing of the intake valve 88.

When the hybrid vehicle 8 transits from the motor running mode to the engine running mode, for example, the engine speed Ne is raised by partially engaging the clutch K0 while allowing the clutch K0 to slip, so that the engine 12 is started. More specifically, engine starting control as will be described later is executed for engine starting.

The electronic control unit 58 performs motor regeneration control during deceleration of the vehicle, i.e., when the foot brake or brake pedal is depressed, or during coasting of the vehicle after the driver ceases to perform a braking operation and an accelerating operation. Namely, the electronic control unit 58 supplies regenerative energy obtained by applying a brake to the running vehicle 8 through regenerative operation of the motor MG, to the power storage device 57. More specifically, under the motor regeneration control, the clutch K0 is released so as to cut off power transmission between the engine 12 and the driving wheels 24, and the engine 12 is stopped, so that the motor MG is operated in a regenerative manner with inertial energy possessed by the vehicle 8. Then, the inertial energy is regenerated as electric power, and the power storage device 57 is charged with the electric power from the motor MG. During execution of the motor regeneration control, the lock-up clutch LU is engaged.

The vehicle 8 includes a control system as illustrated in FIG. 1 by way of example. The electronic control unit 58 as shown in FIG. 1 functions as a control unit for controlling the power train 10, and includes a so-called microcomputer. As shown in FIG. 1, the electronic control unit 58 is supplied with various input signals detected by sensors provided in the hybrid vehicle 8. For example, the electronic control unit 58 receives a signal indicative of the accelerator operation amount Acc as the depression amount of an accelerator pedal 71 detected by an accelerator pedal position sensor 60, a signal indicative of the rotational speed Nmg of the motor MG (motor speed Nmg) detected by a motor speed sensor 62, a signal indicative of the rotational speed Ne of the engine 12 (engine speed Ne) detected by an engine speed sensor 64, a signal indicative of the rotational speed Nt of the turbine wheel 16$t$ of the torque converter 16 (turbine speed Nt) detected by a turbine speed sensor 66, a signal indicative of the vehicle speed V detected by a vehicle speed sensor 68, a signal indicative of the throttle opening θth of the engine 12 detected by a throttle position sensor 70, a signal indicative of the rotational position of the engine output shaft (crankshaft) 26, or crank angle, detected by a crank angle sensor 72, a signal indicative of the state of charge SOC of the power storage device 57 obtained from the power storage device 57, and so forth. Here, the motor speed Nmg detected by the motor speed sensor 62 is equal to the input rotational speed of the torque converter 16, and corresponds to the rotational speed (pump speed) Np of the pump wheel 16$p$ of the torque converter 16. Also, the turbine speed Nt detected by the turbine speed sensor 66 is equal to the output rotational speed of the torque converter 16, and corresponds to the rotational speed Natin of the transmission input shaft 19 of the automatic transmission 18, or the transmission input rotational speed Natin. Also, the rotational speed Natout of the output shaft 20 (which will be called "transmission output shaft 20") of the automatic transmission 18, or transmission output rotational speed Natout, corresponds to the vehicle speed V. The positive direction of the engine torque Te and motor torque Tmg is the same as the direction of rotation of the engine 12 during driving thereof.

Also, various output signals are supplied from the electronic control unit 58 to respective devices provided in the hybrid vehicle 8.

When the engine 12 is started while the vehicle is running in the motor running mode, the electronic control unit 58 of this embodiment performs engine starting control as follows. Initially, the engine speed Ne is raised by partially engaging the clutch K0 while allowing the clutch K0 to slip. After the engine 12 becomes able to rotate by itself, the engaging force of the clutch K0 is temporarily reduced, and then the clutch K0 is fully engaged. In order to provide sufficient driving force that meets the driver's request at the time when the clutch K0 is fully engaged, the electronic control unit 58 advances the opening/closing timing of the intake valve 88 and increases the throttle opening θth until the clutch K0 is fully engaged, after the engine starting control is started. When the engine speed Ne needs to be increased by a large degree from an engine stop condition, during execution of the engine starting control, such as when the motor speed Nmg is considerably high, the opening/closing timing of the intake valve 88 is advanced at an early point in time, and the throttle opening θth is increased at an early point in time, so that the time required for the clutch K0 to be fully engaged is not prolonged. A principal part of control functions of the electronic control unit 58 will be described below referring to FIG. 4. In this embodiment, the engine starting control does not simply mean control of starting of the engine 12, but means control for starting engine 12 by temporarily reducing the engaging force of the clutch K0, during a period from the time when the clutch K0 starts being partially engaged while slipping to the time when the clutch K0 is fully engaged, unless otherwise defined.

Figure 4:
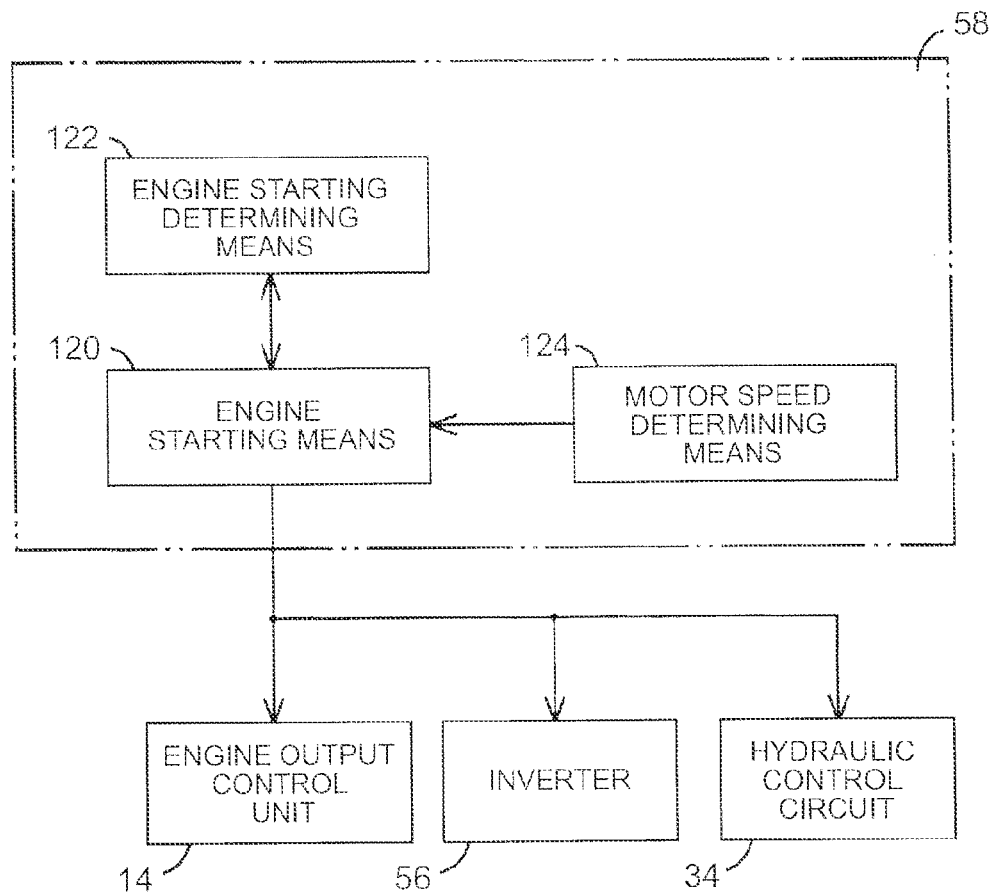
FIG. 4 is a functional block diagram useful for explaining control functions provided in an electronic control unit of FIG. 1.

FIG. 4 is a functional block diagram useful for explaining a principal part of control functions included in the electronic control unit 58. As shown in FIG. 4, the electronic control unit 58 functionally includes an engine starting means 120 as an engine starting unit, an engine starting determining means 122 as an engine starting determining unit, and a motor speed determining means 124 as a motor speed determining unit.

Figure 5:
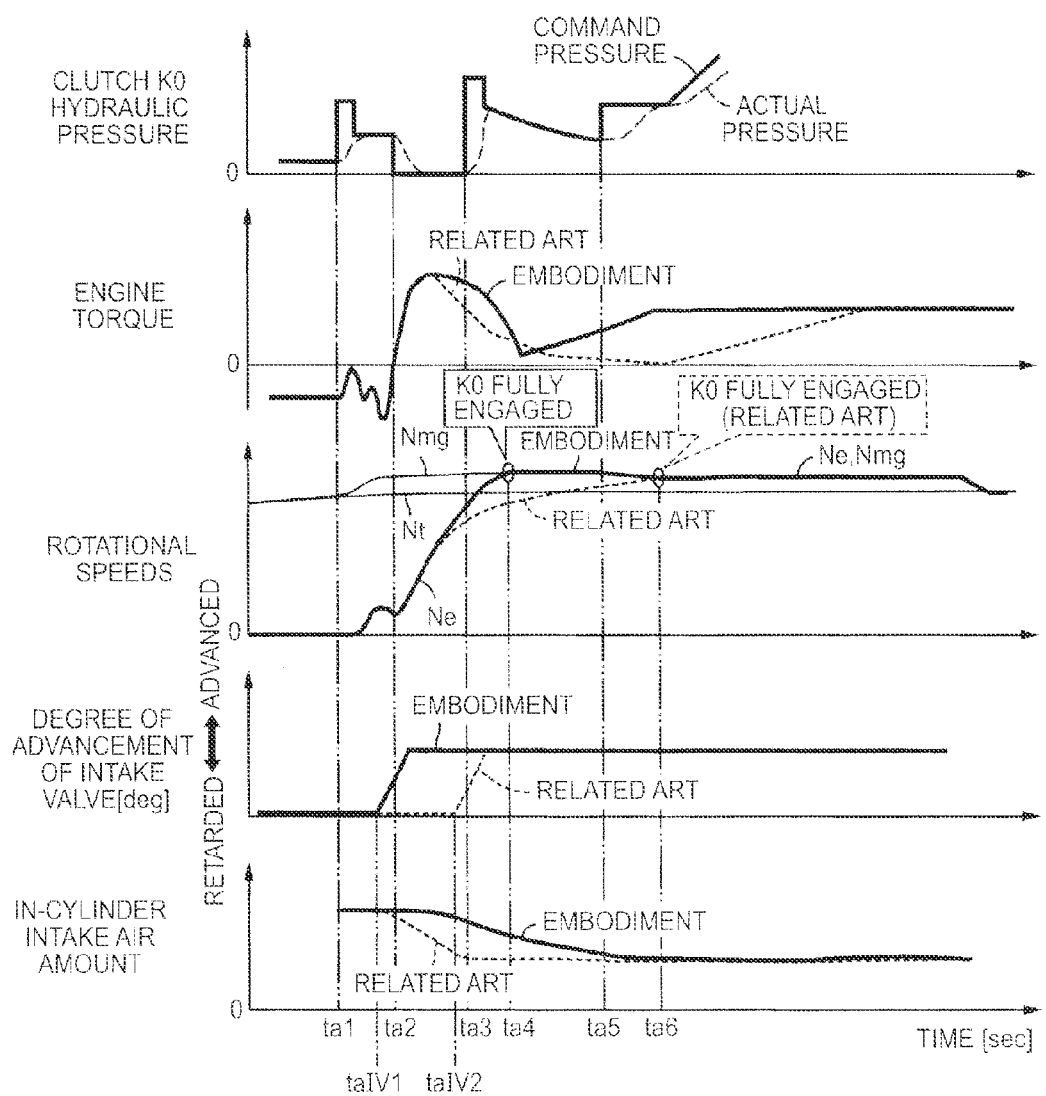
FIG. 5 is a time chart useful for explaining engine starting control executed by the electronic control unit of FIG. 1 for starting the engine while the vehicle is running with power of a motor.

When the engine 12 is started while the vehicle is running in the motor running mode, the engine starting means 120 performs the engine starting control for starting the engine 12 while controlling the engaging force of the clutch K0. At this time, the engine starting means 120 determines whether the ignition starting is feasible, based on the phase of the cylinder 80 that is on the expansion stroke when the engine 12 is in a stopped state. If the ignition starting is feasible, the engine starting means 120 starts the engine 12 through the ignition starting. If, on the other hand, it is determined that the ignition starting is not feasible, normal engine starting is carried out in which the fuel is supplied and ignited after the engine speed Ne is increased to some extent. The engine starting control includes starting of the engine 12 in this manner. For example, when the accelerator operation amount Acc is increased, and the power requirement cannot be satisfied only by the motor MG, an engine start-up request for starting the engine 12 is made so as to switch the vehicle from the motor running mode to the engine running mode. The engine starting means 120 starts the engine 12 by executing the engine starting control, when the engine start-up request is made while the vehicle is running in the motor running mode. FIG. 5 shows a time chart useful for explaining the engine starting control executed by the engine starting means 120.

The time chart of FIG. 5 is used for explaining the engine starting control executed by the electronic control unit 58. Under the engine starting control illustrated in FIG. 5, the engine 12 is started through the ignition starting as described above. In FIG. 5, the engaging hydraulic pressure of the clutch K0, engine torque Te, rotational speeds Ne, Nmg, Nt, the degree of advancement of the opening/closing timing of the intake valve 88, and the amount of intake air in the cylinder, as an accumulated mass of air drawn into each cylinder 80 of the engine 12 per cycle, are indicated in this order as viewed from the top of FIG. 5. In the time chart of the engaging hydraulic pressure, the solid line represents the command value of the engaging hydraulic pressure, or command pressure, and the broken line represents the actual pressure of the engaging hydraulic pressure. In each of the time charts of the engine torque Te, engine speed Ne, degree of advancement, and the in-cylinder intake air amount, the solid line represents this embodiment, and the broken line represents the related art. Namely, the time charts of the related art indicated by the broken lines are obtained in the case where neither the control for advancing the intake valve opening/closing timing at an early point nor the control for increasing the throttle opening at an early point as will be described later is executed. While the in-cylinder intake air amount changes in steps in reality, it appears to change continuously in FIG. 5, for the sake of convenience.

The vehicle 8 runs in the motor running mode since a point prior to time ta1 in FIG. 5, and the engine starting means 120 starts the engine starting control at time ta1. Namely, at time ta1, the engine starting means 120 instructs the hydraulic control circuit 34 to partially engage the clutch K0 while allowing the clutch K0 to slip, and starts the ignition starting of the engine 12. Namely, the engine starting means 120 raises the engine speed Ne by partially engaging the clutch K0 for slip engagement, and start the ignition starting of the engine 12. In short, time ta1 is a start point of the starting of the engine 12. Since the engine starting control is initiated at time ta1, the engine speed Ne starts increasing from zero at a point slightly later than time ta1. Under the engine starting control, the engine starting means 120 increases or decreases motor torque Tmg, so as to cancel torque, such as rotational resistance of the engine 12, which is transmitted from the clutch K0 to the motor MG. As a result, running torque is less likely or unlikely to be affected by engine starting. Then, at time ta2, the engine starting means 120 determines that the engine 12 has become able to rotate by itself, and instructs the hydraulic control circuit 34 to reduce the engaging force of the clutch K0, based on the determination. More specifically, the engine starting means 120 instructs the hydraulic control circuit 34 to release the clutch K0. Namely, the engine starting means 120 temporarily releases the clutch K0 after the engine 12 becomes able to rotate by itself. The determination that the engine 12 becomes able to rotate by itself may be made, for example, when the engine speed Ne exceeds a predetermined rotational speed, or when the crank angle as measured from the start of rotation of the engine 12 exceeds a predetermined angle. Then, at time ta3, the engine starting means 120 instructs the hydraulic control circuit 34 to partially engage the clutch K0 while allowing the clutch K0 to slip again. For example, it is determined whether the instruction at time ta3 is issued, based on an elapsed time from time ta2, or a difference (=Nmg−Ne) in the rotational speed between the engine speed Ne and the motor speed Nmg. Then, at time ta4, the engine speed Ne becomes equal to the motor speed Nmg. Namely, the engine starting means 120 temporarily releases the clutch K0 during a period between time ta2 and time ta3, and then fully engages the clutch K0 at time ta4. At this time ta4, the engine starting control of this embodiment ends. In order to ensure the fully engaged state of the clutch K0, the engine starting means 120 raises the engaging force of the clutch K0 at time ta5, and then gradually increases the engaging force.

Referring back to FIG. 4, the engine starting determining means 122 determines whether the present time is within an engine start-up execution period in which the engine 12 is started while the vehicle is running in the motor running mode. For example, it is determined that it is within the engine start-up execution period, from the time when an engine start-up request is made while the vehicle is running in the motor running mode, to the time when the engine 12 is started and the clutch K0 is fully engaged. In the time chart of FIG. 5, the period from time ta1 to time ta4 is the engine start-up execution period. Regarding the full engagement of the clutch K0, the engine starting determining means 122 sequentially detects the engine speed Ne and the motor speed Nmg, and determines that the clutch K0 is fully engaged when the engine speed Ne becomes equal to the motor speed Nmg while the clutch K0 is being operated in an engaging direction.

If the engine starting determining means 122 determines that the present time is within the engine start-up execution period, it sequentially determines whether the engine starting control is being executed. In the time chart of FIG. 5, it is determined that the engine starting control is being executed, from time ta1 to time ta4.

The motor speed determining means 124 sequentially detects the motor speed Nmg, and determines whether the motor speed Nmg detected when the engine 12 is started in the motor running mode is equal to or higher than a predetermined high-speed rotation determination value NHmg. The motor speed Nmg to be compared with the high-speed rotation determination value NHmg may be detected at any point in time provided that it is detected when the engine 12 is started. For example, the motor speed Nmg to be compared with the high-speed rotation determination value NHmg may be the motor speed Nmg sequentially detected upon or after time ta1 in FIG. 5. In this embodiment, however, it is the rotational speed (motor speed Nmg) detected at a point in time (time ta1) at which the engine starting control is initiated. The high-speed rotation determination value NHmg is empirically set in advance, so that, if the motor speed Nmg is equal to or higher than the high-speed rotation determination value NHmg, it can be determined that the engine 12 needs to be revved up so that it does not take a long period of time from the start of the engine starting control to the full engagement of the clutch K0.

The engine starting means 120 performs the engine starting control as described above referring to FIG. 5. Further, during execution of the engine starting control, namely, when the engine starting determining means 122 determines that the engine starting control is being executed, the opening/closing timing of the intake valve 88 (which may be abbreviated to and expressed as "intake-valve opening/closing timing") is advanced relative to that at the time (e.g., time ta1 in FIG. 5) when the engine starting control is initiated, so that sufficient engine torque Te that meets the driver's request can be obtained immediately after the engine starting control. In order to complete the engine starting control early, intake-valve opening/closing timing early advancement control is performed so as to advance the intake-valve opening/closing timing at an earlier point in time as the motor speed Nmg detected when the engine 12 is started in the motor running mode is higher. More specifically, under the intake-valve opening/closing timing early advancement control, when the motor speed determining means 124 determines that the motor speed Nmg detected when the engine 12 is started in the motor running mode is equal to or higher than the high-speed rotation determination value NHmg, the engine starting means 120 advances the intake-valve opening/closing timing at an earlier point in time than that in the case where the motor speed Nmg is lower than the high-speed rotation determination value NHmg. The intake-valve opening/closing timing may be advanced early by, for example, advancing a point in time at which the intake valve driving system 89 starts its advancing operation to advance the intake valve opening/closing timing, or advancing a point in time at which the intake valve driving system 89 finishes its advancing operation.

The intake-valve opening/closing timing early advancement control will be described with reference to the time chart of FIG. 5. The motor speed Nmg detected at time ta1 in FIG. 5 is equal to or higher than the high-speed rotation determination value NHmg. According to the related art in which the intake-valve opening/closing timing early advancement control is not performed, the engine starting means 120 starts the advancing operation of the intake valve driving system 89 to advance the intake valve opening/closing timing, at time taIV2 after time ta2, for example, as indicated by the broken line in FIG. 5. If the motor speed determining means 124 determines that the motor speed Nmg is lower than the high-speed rotation determination value NHmg, the intake valve driving system 89 starts the advancing operation at time taIV2, as in the related art (broken line). However, in the example of FIG. 5, the motor speed determining means 124 determines that the motor speed Nmg is equal to or higher than the high-speed rotation determination value NHmg; therefore, the engine starting means 120 starts the advancing operation of the intake valve driving system 89, at time taIV1 before time ta2. Although time taIV1 is preferably as close to time ta1 as possible, time taIV1 is set to a point in time at which the intake valve 88 is closed in a particular cylinder 80, so as to reduce rotational resistance (compression torque) due to air compressed in the cylinder 80 when the engine 12 starts being rotated. The particular cylinder 80 is a cylinder 80 in which the intake valve 88 is open at time ta1 at which the engine starting is initiated, and the piston 96 approaches the compression top dead center first as the engine 12 starts rotating from time ta1. For example, the particular cylinder 80 is a cylinder 80 in which the piston position at time ta1 is immediately ahead of the phase corresponding to the solid line Lend in FIG. 3. Namely, in FIG. 5, the engine starting means 120 causes the intake valve driving system 89 to advance the intake valve opening/closing timing, after the intake valve 88 is closed in the cylinder 80 (particular cylinder 80) in which the intake valve 88 was open at the time (time ta1) when starting of the engine 12 was initiated, and the piston 96 approaches the top dead center first since the time when starting of the engine 12 was initiated.

During execution of the engine starting control, the engine starting means 120 increases the throttle opening θth relative to that at the time when the engine starting control is initiated, during execution of the engine starting control, for substantially the same purpose as that of advancing the intake valve opening/closing timing. For example, the throttle opening θth is increased to an opening corresponding to a target engine torque Tet. In order to complete the engine starting control early, throttle opening early increase control is performed so as to increase the throttle opening θth at an earlier point in time as the motor speed Nmg detected when the engine 12 is started in the motor running mode is higher. In short, the engine starting means 120 performs the throttle opening early increase control as well as the intake-valve opening/closing timing early advancement control, during execution of the engine starting control. More specifically, under the throttle opening early increase control, when the motor speed determining means 124 determines that the motor speed Nmg detected when the engine 12 is started in the motor running mode is equal to or higher than the high-speed rotation determination value NHmg, the engine starting means 120 increases the throttle opening θth at an earlier point in time, as compared with the case where the motor speed Nmg is lower than the high-speed rotation determination value NHmg. The throttle opening θth may be increased early by, for example, advancing a point in time at which the operation of an actuator to increase the throttle opening θth starts, or advancing a point in time at which the operation of the actuator ends. The target engine torque Tet is a target value of engine torque Te, and the target engine torque Tet is sequentially determined based on the accelerator operation amount Acc, the vehicle speed V, the gear ratio of the automatic transmission 18, etc., from the relationships empirically determined in advance so that driving force requested by the driver can be obtained.

As show in FIG. 5, in this embodiment, the time when the intake valve opening/closing timing is advanced and the time when the throttle opening θth is increased are advanced, i.e., set to earlier points in time, as compared with those of the related art. Therefore, the in-cylinder intake air amount is increased and the engine torque Te is increased during execution of the engine starting control, as compared with those of the related art (broken lines), whereby the rate of increase of the engine speed Ne is increased. As a result, while the clutch K0 reaches full engagement at time ta6 in the related art (broken line), the clutch K0 reaches full engagement at time ta4 earlier than that of the related art (broken line), in this embodiment (solid line) in which the intake-valve opening/closing timing early advancement control and the throttle opening early increase control are executed. While the amount of advancement (in units of deg., for example) by which the intake valve opening/closing timing is advanced is equal in this embodiment and the related art, the amount of advancement in this embodiment may differ from that of the related art.

FIG. 6 is a flowchart illustrating a principal part of a control routine of the electronic control unit 58, namely, a control routine for performing early advancement control on the intake valve opening/closing timing, and early increase control on the throttle opening, during execution of the engine starting control. For example, the control routine as illustrated in FIG. 6 is started while the vehicle is running in the motor running mode, and is repeatedly executed. The control routine as illustrated in FIG. 6 may be executed alone, or may be executed in parallel with other control routines.

Initially, in step S1 of FIG. 6, it is determined whether the present time is within the engine starting execution period. If an affirmative decision (YES) is made in step S1, namely, if the present time is within the engine starting execution period, the control proceeds to step S2. On the other hand, if a negative decision (NO) is made in step S1, the control proceeds to step S5.

In step S2, it is determined whether the engine starting control, namely, the control for once releasing the clutch K0 that has been partially engaged while slipping, before the engine speed Ne becomes equal to the motor speed Nmg, is being executed. If an affirmative decision (YES) is made in step S2, namely, if the engine starting control is being executed, the control proceeds to step S3. On the other hand, if a negative decision (NO) is made in step S2, the control proceeds to step S5. The determinations in steps S1 and S2 are made by the engine starting determining means 122.

In step S3, the motor speed Nmg is detected, and it is determined whether the motor speed Nmg is equal to or higher than the predetermined high-speed rotation determination value NHmg. If an affirmative decision (YES) is made in step S3, namely, if the motor speed Nmg is equal to or higher than the high-speed rotation determination value NHmg, the control proceeds to step S4. The determination in step S3 is made by the motor speed determining means 124. If a negative decision (NO) is made in step S3, on the other hand, the control proceeds to step S5.

In step S4, an engine rev-up request to rev up the engine 12 during starting of the engine is made. Namely, the intake valve opening/closing timing and the throttle opening θth are basically controlled not to rev up the engine 12 in the beginning of start-up of the engine 12; however, in step S4, the control for suppressing revving-up of the engine is cancelled. Then, the intake valve opening/closing timing is advanced at an earlier point in time as compared with the case where a negative decision (NO) is made in step S3. For example, once the engine starting control is started, the intake valve opening/closing timing is advanced immediately after the intake valve 88 is closed in the above-mentioned particular cylinder 80. Also, the throttle opening θth is increased at an earlier point in time as compared with the case where a negative decision (NO) is made in step S3. For example, the throttle opening θth is increased at the same time that the intake valve opening/closing timing is advanced.

In step S5, the engine rev-up request is not made. For example, if the intake valve opening/closing timing and the throttle opening θth are controlled not to rev up the engine 12 in the beginning of start-up of the engine 12, they are kept controlled not to rev up the engine 12. Steps S4 and S5 correspond to the engine starting means 120.

In this embodiment as described above, when the engine 12 is started while the vehicle is running in the motor running mode, the above-described engine starting control is executed. Namely, the electronic control unit 58 raises the engine speed Ne by partially engaging the clutch K0 while allowing the clutch K0 to slip, and the engaging force of the clutch K0 is temporarily reduced after the engine 12 becomes able to rotate by itself; thereafter, the clutch K0 is fully engaged. After the engine starting control is initiated, the intake valve opening/closing timing is advanced. The higher the motor speed Nmg detected when the engine 12 is started in the motor running mode, the earlier the intake valve opening/closing timing is advanced. With this arrangement, the intake air amount of the engine 12 is increased by advancing the intake valve opening/closing timing, in accordance with the motor speed Nmg. Accordingly, even when the motor speed Nmg is high at the time when the engine is started while the vehicle is running in the motor running mode, the engine torque Te is increased in accordance with the motor speed Nmg. As a result, a period of time it takes from the time (e.g., time ta1 in FIG. 5) when engine starting is initiated to the time when the engine speed Ne becomes equal to the motor speed Nmg, namely, a period of time required for the clutch K0 to be fully engaged, as measured from the beginning of start-up of the engine, is less likely or unlikely to be prolonged because the motor speed Nmg is high. To the contrary, if the motor speed Nmg is low, the time at which the intake valve opening/closing timing is advanced is not set to an earlier point, and the engine speed Ne is less likely or unlikely to rev up to exceed the motor speed Nmg before the clutch K0 is fully engaged; therefore, the clutch K0 can be fully engaged early. Accordingly, when the engine is started while the vehicle is running in the motor running mode, deterioration of the driveability, such as deterioration of the response of the driving force, can be curbed. Also, the period of time it takes from the beginning of engine start-up to the time when the clutch K0 is fully engaged is shortened by advancing the intake valve opening/closing timing, which leads to reduction of a period of time for which the engine output hardly contributes to vehicle running after the fuel starts being supplied to the engine 12. Accordingly, deterioration of the fuel efficiency during engine starting can be curbed.

Also, according to this embodiment, when the engine 12 is started while the vehicle is running in the motor running mode, the electronic control unit 58 increases the throttle opening θth of the engine 12 after the engine starting control is initiated. The higher the motor speed Nmg detected when the engine 12 is started in the motor running mode, the earlier the throttle opening θ is increased. With this arrangement, the intake air amount of the engine 12 increases with the increase of the throttle opening θth, in accordance with the motor speed Nmg. Accordingly, even when the motor speed Nmg is high when the engine is started while the vehicle is running in the motor running mode, the engine torque Te is increased in accordance with the motor speed Nmg. As a result, the period of time it takes from the time when the engine starting is initiated to the time when the clutch K0 is fully engaged is less likely or unlikely to be prolonged because the motor speed Nmg is high. To the contrary, if the motor speed Nmg is low, the time at which the throttle opening θth is increased is not set to an earlier point, and the engine speed Ne is less likely or unlikely to rev up to exceed the motor speed Nmg before the clutch K0 is fully engaged; therefore, the clutch K0 can be fully engaged early. Accordingly, when the engine is started while the vehicle is running in the motor running mode, deterioration of the driveability due to deterioration of the response of the driving force can be curbed. Also, the period of time required for the clutch K0 to be fully engaged, as measured from the beginning of engine start-up, is shortened by increasing the throttle opening θth, which leads to reduction of a period of time for which the engine output hardly contributes to vehicle running after the fuel starts being supplied to the engine 12. Consequently, deterioration of the fuel efficiency during engine starting can be curbed.

Also, according to this embodiment, the electronic control unit 58 advances the intake valve opening/closing timing, after the intake valve 88 is closed in the cylinder 80 (particular cylinder 80) in which the intake valve 88 was open at the time when starting of the engine 12 was initiated, and the piston 96 approaches the top dead center first since the time when starting of the engine 12 was initiated. Therefore, while compression torque that appears in the particular cylinder 80 when the engine 12 starts being rotated during starting of the engine 12 results in rotational resistance of the engine 12, the advancement of the intake valve opening/closing timing is prevented from affecting the compression torque. Accordingly, it is possible to quickly complete engine starting without unnecessarily increasing the rotational resistance of the engine 12.

Here, the control unit as described above may be configured as follows. When the rotational speed of the motor detected when the engine is started in the motor running mode is equal to or higher than a predetermined high-speed rotation determination value, the intake valve timing is advanced relative to the time when the engine starting control is initiated, at an earlier point in time as compared with the case where the rotational speed of the motor is lower than the high-speed rotation determination value.

Also, the control unit may be configured as follows. When the rotational speed of the motor detected when the engine is started in the motor running mode is equal to or higher than the predetermined high-speed rotation determination value, the throttle opening of the engine is increased relative to the time when the engine starting control is initiated, at an earlier point in time as compared with the case where the rotational speed of the motor is lower than the high-speed rotation determination value.

The engine may be a direct injection engine. The control unit may be configured to start the engine through ignition starting by injecting fuel into a cylinder of the engine from the beginning of rotation of the engine and igniting the fuel.

In the above-mentioned ignition starting, the fuel may be injected first into a cylinder in which the piston position is on the expansion stroke, out of a plurality of cylinders included in the direct injection engine, and ignited.

The vehicle may include a hydraulic power transmission device having an input-side rotational element that receives power from the engine and the motor, and an output-side rotational element that delivers the power to the driving wheels.

While one embodiment of the invention has been described in detail with reference to the drawings, it is to be understood that the above-described embodiment is a mere example of the invention, and the invention may be embodied with various changes, or improvements, based on the knowledge of a person having ordinary skill in the art.

For example, while the automatic transmission 18 is a stepwise variable transmission in the above-described embodiment, it may be a continuously variable transmission (CVT) whose speed ratio can be continuously changed. Also, the automatic transmission 18 may be eliminated.

While the engine 12 is a V-type engine in the above-described embodiment, it may be another type of engine, such as an inline or straight engine, or a horizontally-opposed engine. Also, the engine 12 is not limited to an eight-cylinder engine, but may be an engine having three cylinders, four cylinders, six cylinders, or ten cylinders, for example.

While the fuel used in the engine 12 is gasoline in the above-described embodiment, the fuel may be ethanol, or a blended fuel of ethanol and gasoline, or may be hydrogen, LPG, etc.

While the engine 12 is a direct injection engine in the above-described embodiment, it may not be the direct injection engine, but may be an engine in which the fuel is injected into the intake passage 86, for example.

In the time chart of FIG. 5 in the above-described embodiment, the engine starting means 120 releases the clutch K0 at time ta2. However, the clutch K0 is not necessarily fully released, but the engaging force of the clutch K0 may be reduced as compared with that before time ta2, so that slight engaging force that is almost equivalent to the released state remains after time ta2.

While the engine 12 and the motor MG are mounted on the same axis, as shown in FIG. 1, in the above-described embodiment, the motor MG may be mounted on a different axis from that of the engine 12, and may be operatively coupled to between the clutch K0 and the torque converter 16, via a speed change gear or a chain, for example.

While the torque converter 16 includes the lock-up clutch LU in the above-described embodiment, it may not include the lock-up clutch LU. A vehicular power train that is not provided with the torque converter 16 itself may also be considered.

While the torque converter 16 is used as the hydraulic power transmission device in the above-described embodiment, the torque converter 16 may be replaced with a fluid coupling having no torque amplifying function, for example.

While the flowchart of FIG. 6 includes step S1 in the above-described embodiment, the flowchart may not include step S1.

In the above-described embodiment, the intake valve opening/closing timing is advanced at an early point, and the throttle opening θth is increased at an early point, in step S4 of the flowchart of FIG. 6. However, the throttle opening θth may not be increased at an early point.

While the engine 12 is started through the ignition starting in the time chart of FIG. 5 in the above-described embodiment, the engine 12 may not be started through the ignition starting, under the engine starting control. The early advancement control on the intake valve opening/closing timing and the early increase control on the throttle opening may be performed in engine starting that is not the ignition starting.

In the early advancement control on the intake valve opening/closing timing in the above-described embodiment, the intake valve opening/closing timing is advanced after the intake valve 88 is closed in the particular cylinder 80. However, the intake valve opening/closing timing may be advanced without such a limitation on the timing.

In the early advancement control on the intake valve opening/closing timing in the above-described embodiment, the time at which the valve-opening timing and valve-closing timing of the intake valve 88 are advanced is set to an earlier point in time as the motor speed Nmg detected when the engine 12 is started in the motor running mode is higher. However, the time at which the valve-opening timing is advanced may not be set to an earlier point, but only the time at which the valve-closing timing is advanced may be set to an earlier point.

In the early advancement control on the intake valve opening/closing timing in the above-described embodiment, the time at which the opening/closing timing of the intake valve 88 is advanced is changed in steps, depending on whether the motor speed Nmg is equal to or higher than the high-speed rotation determination value NHmg. However, the time at which the valve opening/closing timing is advanced may be continuously changed according to the motor speed Nmg. Similarly, in the early increase control on the throttle opening, the time at which the throttle opening θth is increased may be continuously changed according to the motor speed Nmg.

While no explanation concerning the ignition timing of the engine 12 is provided in the flowchart of FIG. 6 of the above-described embodiment, the ignition timing of the engine 12 may be advanced, for example, when an affirmative decision (YES) is made in step S3, namely, when the motor speed Nmg is equal to or higher than the high-speed rotation determination value NHmg. With the ignition timing of the engine 12 thus advanced, an advantageous effect that engine starting is completed earlier can be provided. More specifically, the torque of the engine 12 is increased due to advancement of the ignition timing, and the engine speed Ne can be raised (i.e., the engine 12 can be revved up) early.

What is claimed is:

1. A vehicle comprising:
   an engine including a variable valve timing mechanism for an intake valve, the variable valve timing mechanism being configured to advance or retard an intake valve timing;
   a motor;
   a clutch that selectively couples the engine to a power transmission path between the motor and driving wheels; and
   a control unit configured to perform engine starting control when the engine is started in a motor running mode in which the vehicle runs only with power of the motor, by partially engaging the clutch while allowing the clutch to slip so as to raise a rotational speed of the engine, temporarily reducing engaging force of the clutch after the engine becomes able to rotate by itself, and then fully engaging the clutch,
   the control unit being configured to advance the intake valve timing at an earlier point in time, after the engine starting control is initiated, as a rotational speed of the motor detected when the engine is started in the motor running mode is higher.

2. The vehicle according to claim 1, wherein:
   the control unit is configured to increase a throttle opening of the engine after the engine starting control is initiated, when the engine is started in the motor running mode; and
   the control unit is configured to increase the throttle opening at an earlier point in time as the rotational speed of the motor detected when the engine is started in the motor running mode is higher.

3. The vehicle according to claim 1, wherein
   the control unit is configured to advance the intake valve timing, after the intake valve is closed in an cylinder in which the intake valve is open at a time when starting of the engine is initiated, and a piston approaches a top dead center first since the time when starting of the engine is initiated.

4. The vehicle according to claim 1, wherein
   the control unit is configured to advance an ignition timing of the engine when the rotational speed of the motor is equal to or higher than a high-speed rotation determination value.

5. A control method for a vehicle including an engine, a motor, and a clutch that selectively couples the engine to a power transmission path between the motor and driving wheels, comprising:
   executing engine starting control including the steps of i) raising a rotational speed of the engine by partially engaging the clutch while allowing the clutch to slip, when the engine is started in a motor running mode in which the vehicle runs only with power of the motor, ii) temporarily reducing engaging force of the clutch after the engine becomes able to rotate by itself, and iii) fully engaging the clutch after the step ii); and
   advancing an intake valve timing at an earlier point in time, after the engine starting control is initiated, as a rotational speed of the motor detected when the engine is started in the motor running mode is higher.

6. The control method according to claim 5, wherein:
   a throttle opening of the engine is increased after the engine starting control is initiated, when the engine is started in the motor running mode; and
   the throttle opening is increased at an earlier point in time as the rotational speed of the motor detected when the engine is started in the motor running mode is higher.

7. The control method according to claim 5, wherein
   the intake valve timing is advanced, after the intake valve is closed in an cylinder in which the intake valve is open at a time when starting of the engine is initiated, and a piston approaches a top dead center first since the time when starting of the engine is initiated.

8. The control method according to claim 5, wherein
   an ignition timing of the engine is advanced when the rotational speed of the motor is equal to or higher than a high-speed rotation determination value.

* * * * *